(12) United States Patent
Wright et al.

(10) Patent No.: US 9,274,622 B2
(45) Date of Patent: Mar. 1, 2016

(54) DEVICE SPECIFIC DATA IN A UNIFIED POINTER MESSAGE

(75) Inventors: Stephen Wright, Bothell, WA (US); Hirofumi Yamamoto, Bellevue, WA (US); Pak Kiu Chung, Redmond, WA (US); Raju Ramanathan, Redmond, WA (US); Krishnan Menon, Redmond, WA (US); Lawrence Osterman, Woodinville, WA (US); Alan Stephenson, Redmond, WA (US); Reed Townsend, Kirkland, WA (US); Jacob Rossi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 13/609,258

(22) Filed: Sep. 11, 2012

(65) Prior Publication Data

US 2014/0075458 A1 Mar. 13, 2014

(51) Int. Cl.
*G06F 9/54* (2006.01)
*G06F 3/038* (2013.01)
*G06F 9/44* (2006.01)

(52) U.S. Cl.
CPC ............ *G06F 3/038* (2013.01); *G06F 9/4411* (2013.01); *G06F 9/4443* (2013.01)

(58) Field of Classification Search
CPC ............ G06F 2203/0381; G06F 3/038; G06F 9/4443; G06F 9/4411
See application file for complete search history.

(56) References Cited

U.S. PATENT DOCUMENTS

| 5,157,384 A | * | 10/1992 | Greanias | G06F 3/023 345/156 |
| 5,442,376 A | * | 8/1995 | Tannenbaum | G06F 3/038 345/156 |
| 5,968,136 A | * | 10/1999 | Saulpaugh et al. | 710/3 |
| 8,185,838 B2 | | 5/2012 | Bomers | |
| 2006/0149550 A1 | * | 7/2006 | Salminen | 704/270.1 |
| 2006/0220834 A1 | * | 10/2006 | Maeng | 340/539.1 |
| 2008/0313607 A1 | | 12/2008 | Yutaka et al. | |
| 2011/0122070 A1 | | 5/2011 | Smith et al. | |
| 2013/0194174 A1 | * | 8/2013 | Bondan et al. | 345/156 |

OTHER PUBLICATIONS

Townsend, Reed, "Modernizing Input in Windows 8", Retrieved at <<http://blogs.msdn.com/b/windowsappdev/archive/2012/07/02/modernizing-input-in-windows-8.aspx>>, Jul. 2, 2012, pp. 15.
"iAuxINP 2.1.1256", Retrieved at <<http://mac.brothersoft.com/iauxinp.html>>, Sep. 6, 2010, pp. 2.
"Do We Need Touch Events?", Retrieved at <<http://www.quirksmode.org/blog/archives/2010/02/do_we_need_touc.html>>, Feb. 8, 2011, pp. 6.

(Continued)

*Primary Examiner* — Syed Roni
(74) *Attorney, Agent, or Firm* — Timothy Churna; Judy Yee; Micky Minhas (57) ABSTRACT

In one embodiment, a unified pointer message 300 may describe in a single type of pointer message a coordinate input from a user via multiple types of pointer devices. An input device interface 150 may receive a coordinate input 350 from an input device. A processor 120 may execute an application programming interface layer 430 that creates a unified pointer message 300 for the coordinate input 350. The processor 120 may send the unified pointer message 300 to an application. The processor 120 may process a device specific data set 244 unhandled by the application.

20 Claims, 8 Drawing Sheets

(56) References Cited

OTHER PUBLICATIONS

Hakvoort, Michiel., "A Unifying Input Framework for Multi-Touch Tables", Retrieved at <<http://www.google.co.in/url?sa=t&rct=j&q=application+unify+and+translate+all+mouse+and+touch+input+&source=web&cd=1&ved=0CE4QFjAA&url=http%3A%2F%2Freferaat.cs.utwente.nl%2FTSConIT%2Fdownload.php%3Fid%3D451&ei=ywkaUL_yBI-ViAfa0YG4DQ&usg=AFQjCNE26AWfO-xB_wKSyO7GNiU25bwBcw&cad=rja>>, In the Proceedings of 10thTwente Student Conference on IT, Jan. 23, 2009, pp. 8.

Rossi, Jacob, "Touch Input for IE10 and Metro style Apps", Retrieved at <<http://blogs.msdn.com/b/ie/archive/2011/09/20/touch-input-for-ie10-and-metro-style-apps.aspx>>, Sep. 21, 2011, pp. 17.

"Pointer and Gesture Events", Retrieved at <<http://msdn.microsoft.com/en-US/library/ie/hh673557.aspx>>, Retrieval Date: Sep. 10, 2012, pp. 5.

Rossi, Jacob, "Go Beyond Pan, Zoom, and Tap Using Gesture Events", Retrieved at <<http://blogs.msdn.com/b/ie/archive/2012/06/20/go-beyond-pan-zoom-and-tap-using-gesture-events.aspx>>, Jun. 20, 2012, pp. 5.

Rossi, Jacob, "Guidelines for Building Touch-friendly Sites", Retrieved at <<http://blogs.msdn.com/b/ie/ archive/2012/04/20/guidelines-for-building-touch-friendly-sites.aspx>>, Apr. 20, 2012, pp. 9.

Johnson, Ted, "Handling Multi-touch and Mouse Input in All Browsers," Retrieved at <<http://blogs.msdn.com/b/ie/archive/2011/10/19/handling-multi-touch-and-mouse-input-in-all-browsers.aspx>>, Oct. 19, 2011, pp. 7.

* cited by examiner

Figure 2

| POINTER TYPE 310 |
|---|
| POINTER ID 320 |
| SOURCE DEVICE 330 |
| OPERATING SYSTEM HANDLE 340 |
| COORDINATE INPUT 350 |
| DEVICE SPECIFIC DATA FLAG 360 |
| DEVICE SPECIFIC DATA 370 |
| CURRENT DEVICE SPECIFIC DATA STATE 380 |

| PREVIOUS DEVICE SPECIFIC DATA STATE 390 | DEVICE DELTA 392 |
|---|---|

DEVICE SPECIFIC DATA IN A UNIFIED POINTER MESSAGE

BACKGROUND

A coordinate input device, or pointer device, may interact with a computing device to indicate to the computer a selected virtual location. The virtual location may be represented by a point on a display or other visual presentation device. A pointer device may be a mouse, an electronic pen, a touch input device, a gesture recognition device, or other device indicating a set of coordinates to the computing device. A touch input device may be touch screen, a track pad, or touch recognition system.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to describing in a single type of pointer message a coordinate input from a user via multiple types of pointer devices. An input device interface may receive a coordinate input from an input device. A processor may execute an application programming interface layer that creates a unified pointer message for the coordinate input. The processor may send the unified pointer message to an application. The processor may process a device specific data set unhandled by the application.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a pointer device interface.

A pointer device interface may process coordinate data input by a user to indicate a virtual location, as well as any associated control data provided by a pointer device. The pointer device interface may unify input data from a variety of sources using a superset of any data sent by common pointing devices, referred to as a unified pointer message. The unified pointer message may be extensible to accommodate future device types. Using the unified pointer message, data from any supported device types can be represented by a single event type. In addition, the unified pointer message may provide a consistent coordinate system for any input, or allow for an application to convert the coordinate input data between multiple coordinate systems. Additionally, the unified pointer message may indicate a unified pointer event type to differentiate data from different devices. The subset of data included in a specific instance of the pointer event depends on the device originating the data. A unified pointer message may report a core subset of data, such as device type, device identifier, or coordinates. The unified pointer message may also report an optional subset of data, such as button state, geometry, pressure, and other data that may vary from device to device. This optional subset of data is referred to as a device specific data set. The unified pointer message may indicate spatial coordinates, control and interaction state, and control change data.

If a legacy application is unable to handle a device specific event, the pointer device interface may translate an unhandled device specific event from a unified pointer message to a legacy device message more easily interpreted by the legacy application, such as a mouse message. The pointer device interface may be passed events that are not handled by the application to translate from unified pointer messages back to legacy device messages, such as a mouse message, a gesture message, a touch message, or a pen message. The pointer device interface may translate the unified pointer message to whichever legacy device message provides the most data-rich message while still being consumable by the legacy application. The pointer device interface may convert the device specific data into a legacy device message that the legacy application may more easily understand and process. For example, as many legacy applications may process a mouse message, touch device data may be converted to a mouse message for easier interpretation. A double tap on the touch device may be presented in a mouse message in the legacy application as a mouse button click.

Applications may listen just for the coordinate data, ignoring further data unless requested by the application. The unified pointer message may be used by desktop applications, multimedia applications, and other applications. Further, a web application framework, such as a web browser or an extensible application markup language (XAML) framework, may translate the unified pointer message for use by web applications, such as hypertext markup language (HTML) applications or extensible application markup language applications.

Thus, in one embodiment, a unified pointer message may describe in a single type of pointer message a coordinate input from a user via multiple types of pointer devices. An input device interface may receive a coordinate input from an input device. A processor may execute an application programming interface layer that creates a unified pointer message for the coordinate input. The processor may send the unified pointer message to an application. The processor may process a device specific data set unhandled by the application.

Figure 1:
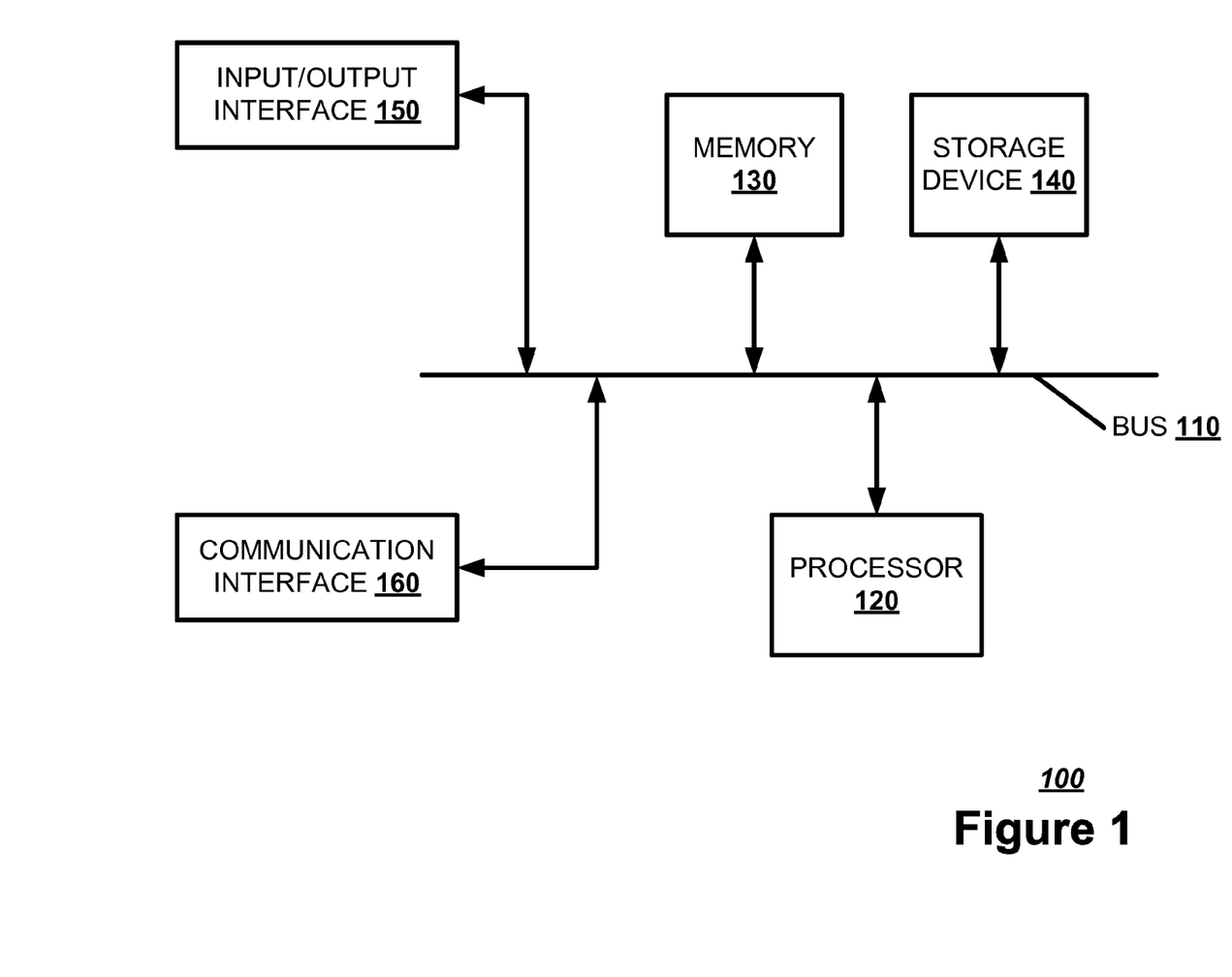
FIG. 1 illustrates, in a block diagram, one embodiment of a computing device.

FIG. 1 illustrates a block diagram of an exemplary computing device 100 which may act as a pointer device interface. The computing device 100 may combine one or more of hardware, software, firmware, and system-on-a-chip technology to implement a pointer device interface. The computing device 100 may include a bus 110, a processor 120, a memory 130, a data storage 140, an input/output device interface 150, and a communication interface 160. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as may occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method.

The input/output device interface 150 may include one or more conventional mechanisms that permit a user to input information to the computing device 100, such as a keyboard, a mouse, a voice recognition device, a microphone, a headset, a gesture capture device, a touch screen, etc. The input/output device interface 150 may include one or more conventional mechanisms that output information to the user, including a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface.

The computing device 100 may perform such functions in response to a processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
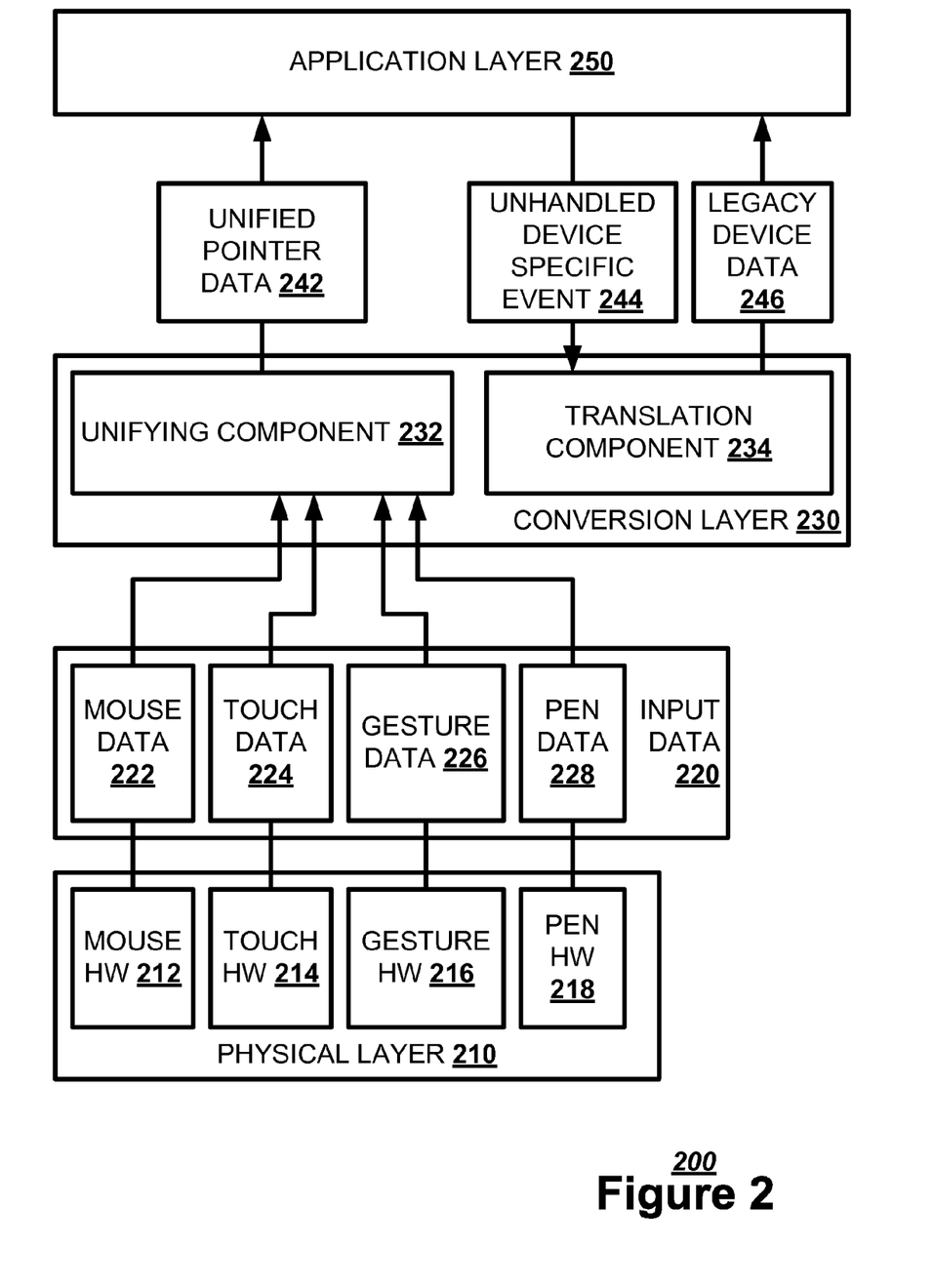
FIG. 2 illustrates, in a block diagram, one embodiment of a pointer device interface.

FIG. 2 illustrates, in a block diagram, one embodiment of a pointer device interface 200. A physical layer 210 represents the physical hardware used by the computing device 100. The physical layer 210 may represent the pointer devices, such as mouse hardware 212, the touch input hardware 214, the gesture capture hardware 216, the pen hardware 218, and other hardware. The pointer hardware of the physical layer 210 may be one of many sources of hardware specific input data 220 for a conversion layer 230 to encapsulate in a unified pointer message. For example, the mouse hardware 212 may send the mouse data 222, such as the coordinate position of the mouse and the mouse button state. Touch input hardware 214 may send touch input data 224, such as a the coordinate position of the touch on the touch screen, the state change of the touch on the touch screen, the geometry of the touch screen, or the pressure of the touch on the touch screen. Gesture capture hardware 216 may send gesture capture data 226, such as the position of the user's hand relative the capture device and any gesture being made by the user's hand. The pen hardware 218 may send pen data 228, such as the position of the pen, the state change of the pen, the orientation of the pen relative to the contact point, or the pressure of the pen against the contact point.

A unifying component 232 of the conversion layer 230 may send the unified pointer data 242, in the form of a unified pointer message, to the application layer 250. The application layer 250 may receive a set of device specific data in the unified pointer data 242, such as the user clicking a mouse button or making a pinching motion on a touch screen. If the application receives the device specific data set, referred to as a device specific event, and is unable to handle the device specific event, the application layer 250 may send the unhandled device specific data set 244 to a translation component 234 of the conversion layer 230. The conversion layer 230 may translate the unified pointer data 242 to the legacy device data 246 form that provides the most data while still being understood by the application. The translation component 234 may calculate more easily interpreted legacy device data 246, such as mouse data, and return the legacy device data 246 to the application layer 250. For example, a pinching gesture or a tap gesture received by gesture capture hardware 216 and represented in a unified pointer message may be translated into mouse wheel data or a mouse click from mouse hardware 212 for easier interpretation by legacy applications.

Figure 3:
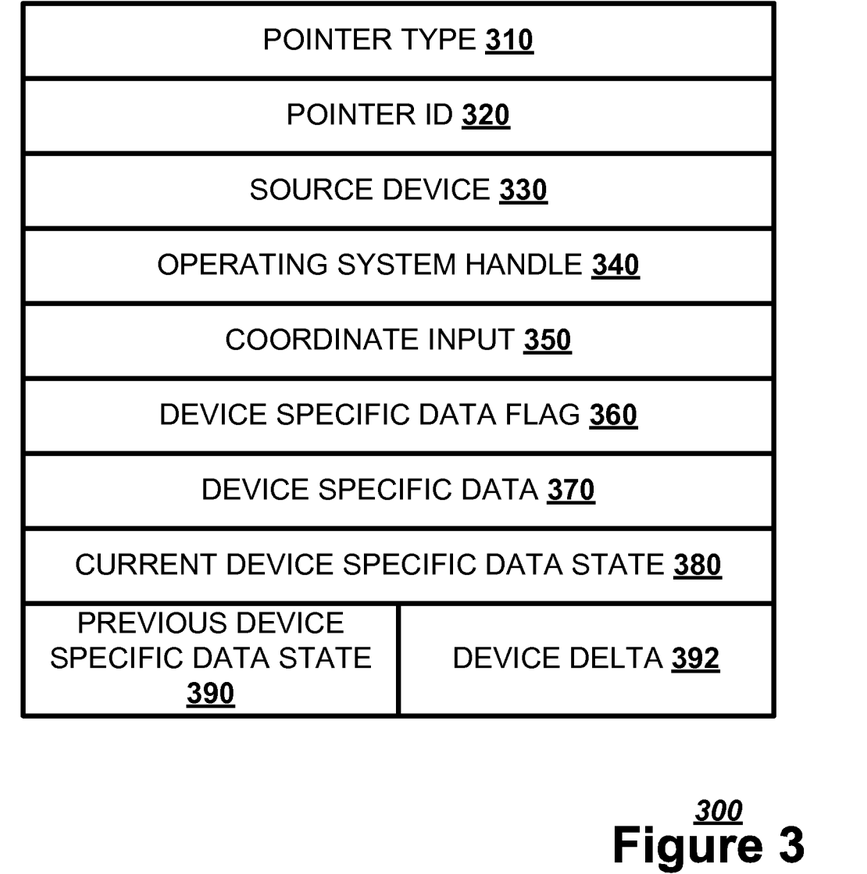
FIG. 3 illustrates, in a block diagram, one embodiment of a unified pointer message.

FIG. 3 illustrates, in a block diagram, one embodiment of a unified pointer message 300. A unified pointer message 300 is a message that may describe a coordinate input from any pointer device without modifying the unified pointer message 300 structure. The unified pointer message 300 may have a pointer type 310 identifying the type of pointer data being stored, such as a pen device, a mouse device, a touch device, a gesture capture device, or other pointer device. A pointer identifier 320 may identify the unified pointer message 300. A source device field 330 may identify the pointer device providing the coordinate input. The operating system handle 340 may provide a handle for the operating system to call the unified pointer message 300. A coordinate input field 350 may provide the coordinate data reported by the pointer device.

A device specific data flag 360 may indicate whether device specific data is available. Device specific data describes any feature on the input device that allows users to enter an auxiliary signal separate from the coordinate data, such as the buttons or track wheel on a mouse or the geometry and pressure of a touch on a touch pad. A device specific data field 370 describing the device specific data, such as geometry, pressure, and other device specific data. A current device specific state 380 may describe the current state of the auxiliary data signal for the pointer device. The unified pointer message 300 may indicate any changes to the device specific state. The unified pointer message 300 may have a previous device specific state 390 describing the previous state of the auxiliary data signal so that the application may determine any changes and interpret the action requested by the user. Alternately, the unified pointer message 300 may have a device specific data delta 392 describing the change in state of the auxiliary data signal.

Figure 4:
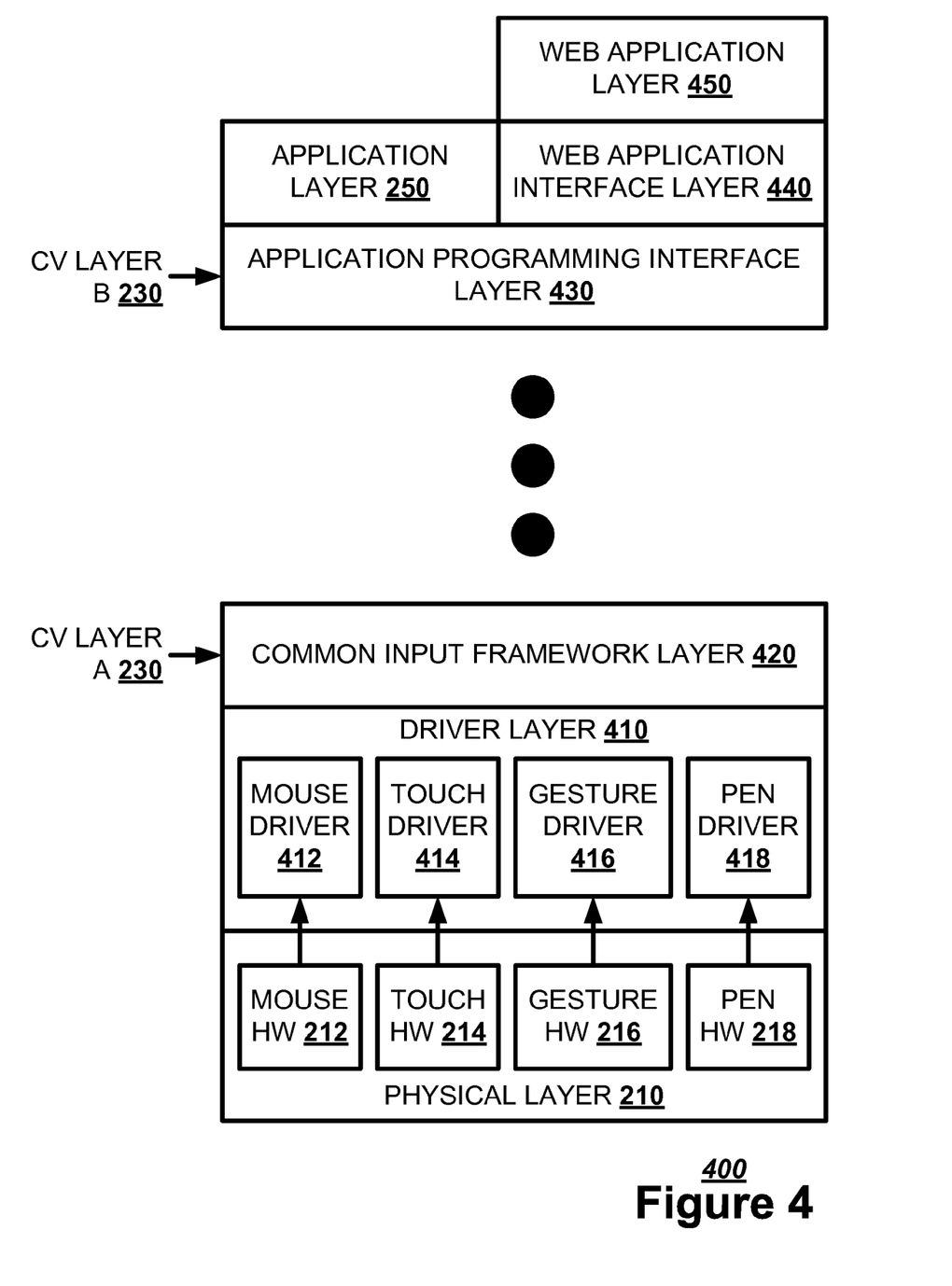
FIG. 4 illustrates, in a block diagram, one embodiment of a computer layer architecture that may implement a pointer device interface.

FIG. 4 illustrates, in a block diagram, one embodiment of a computer layer architecture 400 that may implement a pointer device interface 200. A driver layer 410 represents the drivers that allow a computing device 100 to interact with hardware in the physical layer 210. The driver layer 410 may represent the drivers for the pointer devices, such as a mouse driver 412, a touch input driver 414, a gesture capture driver 416, a pen driver 418, and other drivers, including virtual device drivers. A common input framework layer 420 may receive inputs from each driver in the driver layer 410, such as coordinate inputs or device specific data. The common input framework layer 420 may send the hardware inputs up through one or more layers of the operating system to the application programming interface (API) layer 430. The application programming interface layer 430 may pass the hardware inputs to any application being run at the application layer 250 being run on the operating system. The application layer 250 may support further layers, such as running a web browser that supports further web applications.

The application programming interface layer 430 may be a traditional application programming interface layer or a communication object model (COM)-based application programming interface layer. A traditional application programming interface layer, such as a Win32® application programming interface layer, provides a standard set of functionality for a graphical user interface operating system. A traditional application programming interface layer may process a common subset of the pointer types available in pointer data, such as location, button state, device type, source device, and other data. A communication object model-based application programming interface layer, such as a Windows Runtime® application programming interface layer, supports interaction with a variety of component objects. A communication object model-based application programming interface layer may process each pointer object as having common base properties and a property bag with relevant type-specific data. The pointer device interface 200 may tailor the unified pointer message 300 to the idioms of the framework.

The application programming interface layer 430 may pass the unified pointer message 300 to a web application interface layer 440, such as a document object model (DOM) interface layer, for conversion for a web application layer 450. A document object model interface layer, such as a web browser, is a web application interface layer oriented towards interacting with document objects, such as objects in hypertext markup language documents and extensible markup language (XML) documents. A document object model interface layer may process a flat union of interesting properties across pointer types.

In one embodiment, the conversion layer 230 may be the common input framework layer 420. Alternately, the conversion layer 230 may be the application programming interface layer 430. The common input framework layer 420 is close to driver layer 410, while the application programming interface layer 430 is close to the application layer 250. By moving the conversion layer 230 further up the computer layer architecture 400 to the application programming interface layer 430, intermediate layers may process any extra data provided by a more expressive pointer device, such as a mouse device, before the coordinate data even reaches the application.

Figure 5:
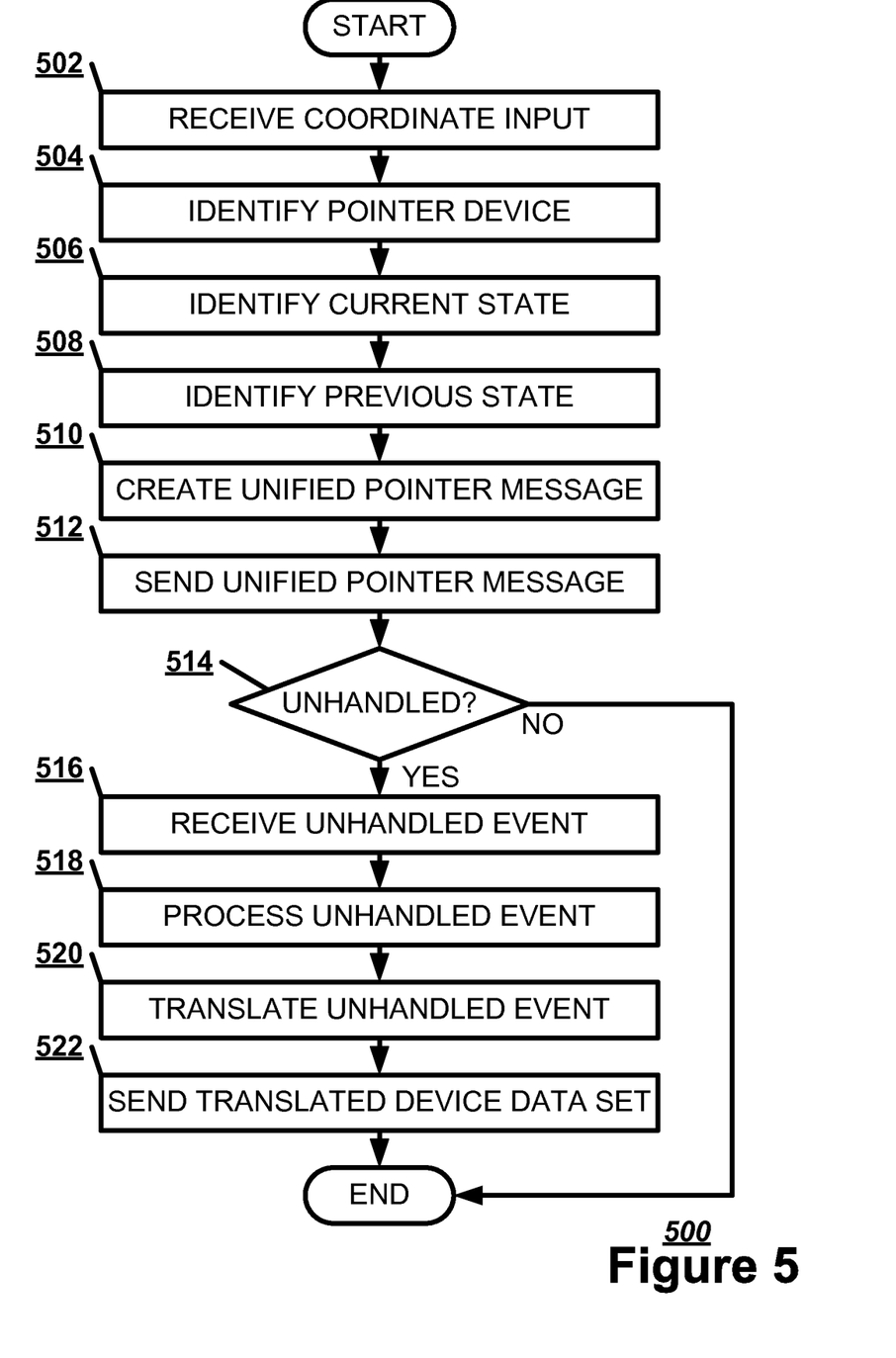
FIG. 5 illustrates, in a flowchart, one embodiment of a method for processing a coordinate input using translation.

FIG. 5 illustrates, in a flowchart, one embodiment of a method 500 for processing a coordinate input using translation. The pointer device interface 200 may receive a coordinate input from a pointer device driver (Block 502). The pointer device driver may send a coordinate input from a physical hardware device or a simulated coordinate input from a virtual hardware device. The pointer device interface 200 may identify in the unified pointer message 300 the pointer device driver providing the coordinate input (Block 504). The pointer device interface 200 may identify a current device specific state 380 in the unified pointer message 300 (Block 506). The pointer device interface 200 may identify a previous device specific state 390 in the unified pointer message 300 (Block 508). Alternately, the pointer device interface 200 may calculate a device specific data delta 392 for the unified pointer message. The pointer device interface 200 may create the unified pointer message 300 for the coordinate input, either at a common input framework layer 420 or at an application programming interface layer 430 (Block 510). The pointer device interface 200 may send the unified pointer message 300 to an application (Block 512).

If the application is unable to handle a device specific event (Block 514), the pointer device interface 200 may receive an unhandled device specific data set 244 from the application (Block 516). The pointer device interface 200 may process a device specific data set 244 unhandled by the application (Block 518). The pointer device interface 200 may translate an unhandled device specific data set 244 to at least one of a mouse event or a gesture event for the application (Block 520). The pointer device interface 200 may send a translated device data set 246 to the application (Block 522).

Figure 6:
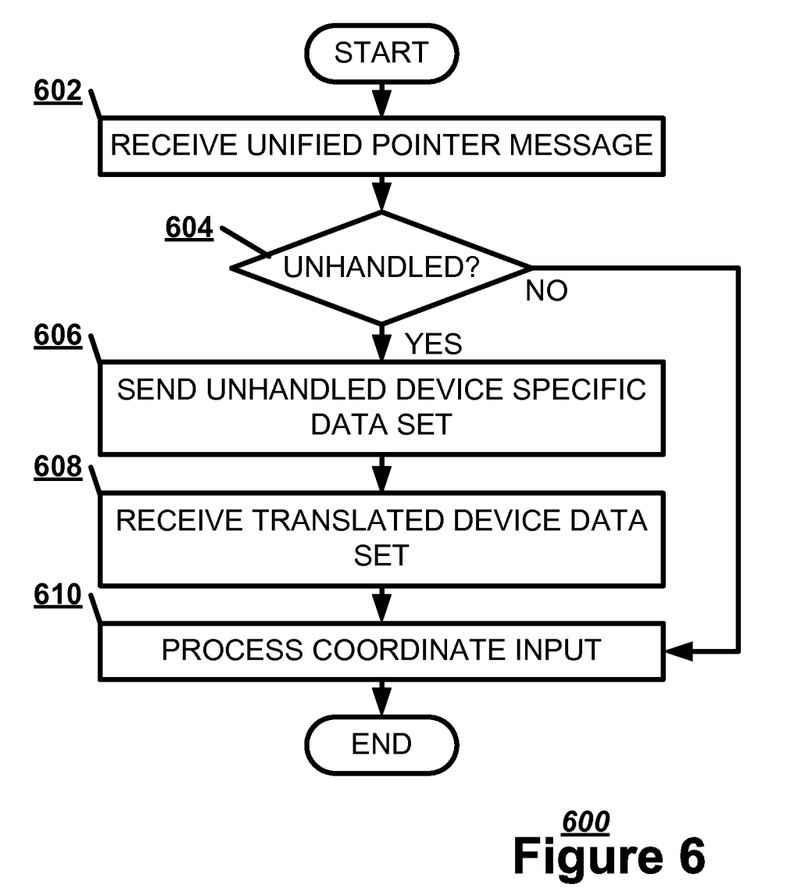
FIG. 6 illustrates, in a flowchart, one embodiment of a method for receiving a coordinate input in an application.

FIG. 6 illustrates, in a flowchart, one embodiment of a method 600 for receiving a coordinate input in an application. The application may receive a unified pointer message 300 having the coordinate input from the pointer device interface 200 (Block 602). If the application chooses to forgo processing an unhandled pointer event (Block 604), the application may send the unhandled device specific data set 244 to the translation component 234 of the conversion layer 230 of the pointer device interface 200 (Block 606). The application may receive a translated device data set 246 from the translation component 234 (Block 608). The application may then process the coordinate input (Block 610).

Figure 7:
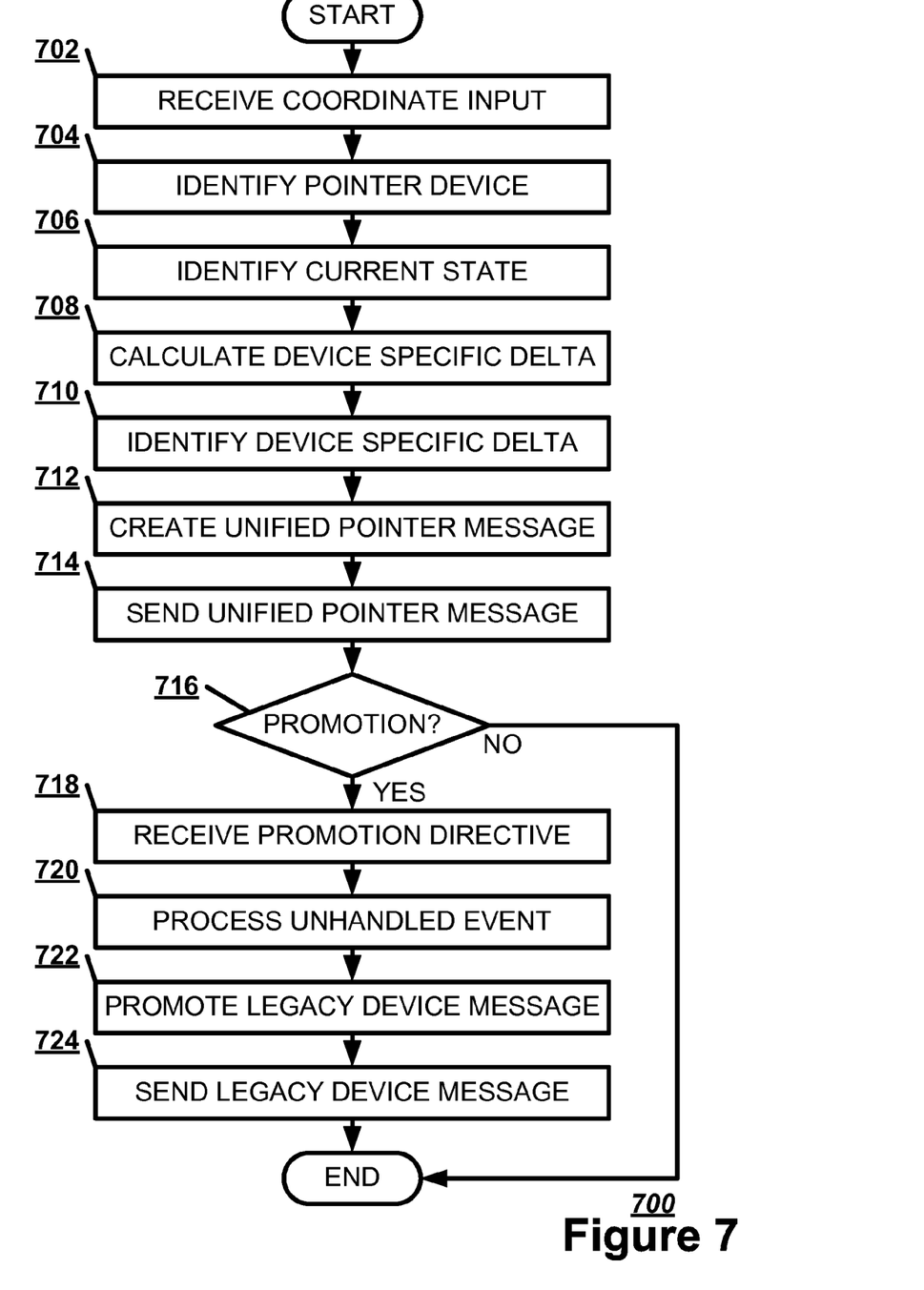
FIG. 7 illustrates, in a flowchart, one embodiment of a method for processing a coordinate input using message promotion.

In one embodiment, the pointer device interface may process unhandled pointer data by promoting a mouse message. FIG. 7 illustrates, in a flowchart, one embodiment of a method 700 for processing a coordinate input using message promotion. The pointer device interface 200 may receive a coordinate input from a pointer device (Block 702). The pointer device interface 200 may identify in the unified pointer message 300 the pointer device providing the coordinate input (Block 704). The pointer device interface 200 may identify a current device specific state 380 in the unified pointer message 300 (Block 706). The pointer device interface 200 may calculate a device specific data delta for the unified pointer message 300 (Block 708). The pointer device interface 200 may identify the device specific data delta in the unified pointer message 300 (Block 710). Alternately, the pointer device interface 200 may identify a previous device specific state 390 in the unified pointer message 300. The pointer device interface 200 may create the unified pointer message 300 for the coordinate input, either at a common input framework layer 420 or at an application programming interface layer 430 (Block 712). The pointer device interface 200 may send the unified pointer message 300 to an application (Block 714).

If the application opts to promote a legacy device message based on the unified pointer message 300 (Block 716), the pointer device interface 200 may receive a promotion directive form the application (Block 718). The pointer device interface 200 may process a device specific data set 244 unhandled by the application (Block 720). The pointer device interface 200 may promote a legacy device message based on the unified pointer message 300 (Block 722). The pointer device interface 200 may send the legacy device message to the application (Block 724).

Figure 8:
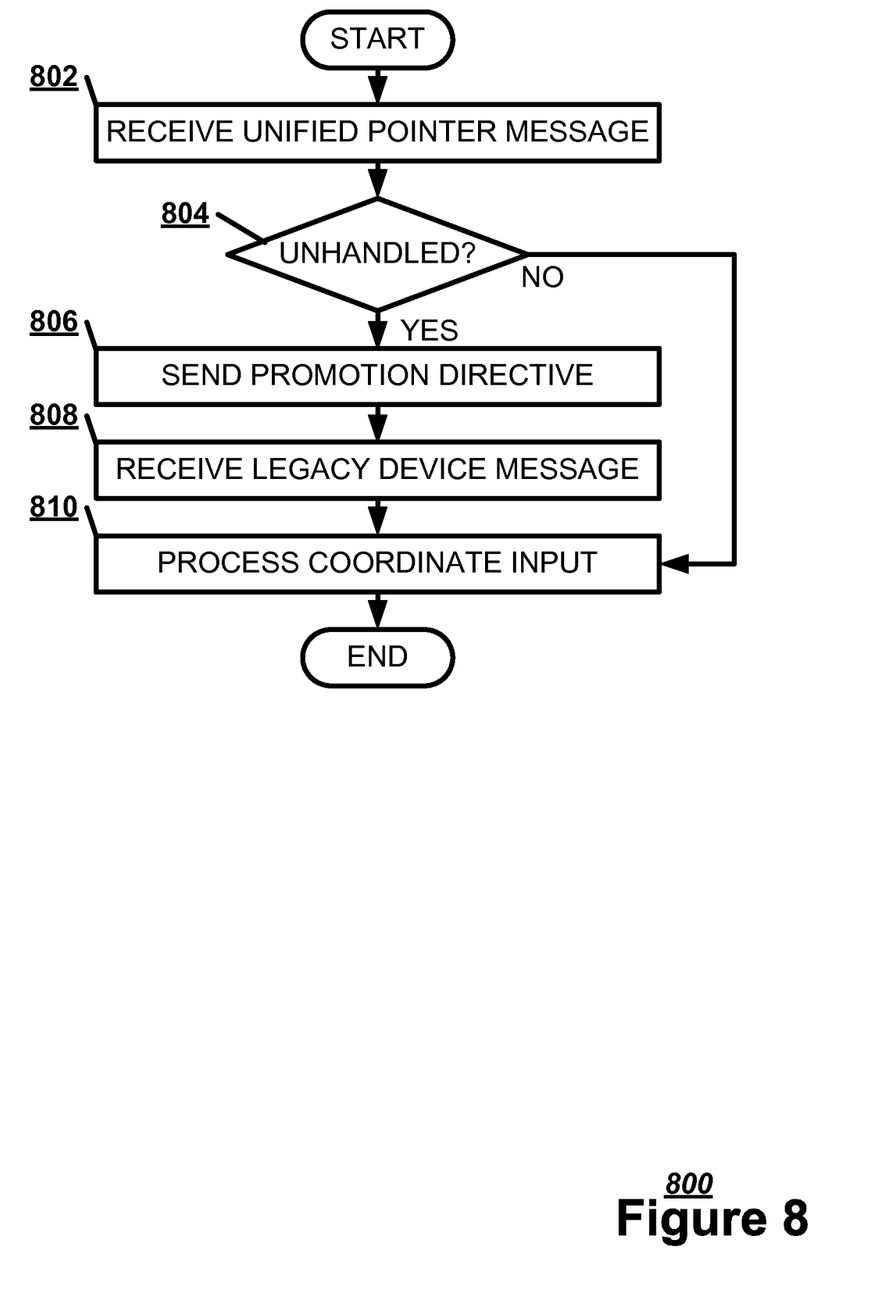
FIG. 8 illustrates, in a flowchart, one embodiment of a method for receiving a coordinate input in an application using message promotion.

FIG. 8 illustrates, in a flowchart, one embodiment of a method 800 for receiving a coordinate input in an application using message promotion. The application may receive a unified pointer message 300 having the coordinate input from the pointer device interface 200 (Block 802). If the application opts to promote the mouse messages over the unified pointer message 300 (Block 804), the application may send a promotion directive to the pointer device interface 200 (Block 806). The application may receive a legacy device message from the pointer device interface (Block 808). The application may then process the coordinate input (Block 810).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include a computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving a coordinate input from a pointer device driver;
creating a unified pointer message at an application programming interface layer representing the coordinate input from a touch input hardware and a mouse hardware as a single event type using a superset of data that is common to a plurality of pointer devices and a subset of data including a device specific data set that is specific to a pointer device among the plurality of pointer devices;
sending the unified pointer message to an application; and
processing the device specific data set unhandled by the application.

2. The method of claim 1, further comprising:
identifying in the unified pointer message the pointer device driver providing the coordinate input.

3. The method of claim 1, further comprising:
receiving the unhandled device specific data set from the application.

4. The method of claim 1, further comprising:
translating the unhandled device specific data set to at least one of a mouse event and a gesture event for the application.

5. The method of claim 1, further comprising:
identifying a current device specific state in the unified pointer message.

6. The method of claim 1, further comprising:
identifying a previous device specific state in the unified pointer message.

7. The method of claim 1, further comprising:
calculating a device specific data delta for the unified pointer message.

8. A tangible machine-readable medium having a set of instructions detailing a method stored thereon that when executed by one or more processors cause the one or more processors to perform the method, the method comprising:
receiving a coordinate input from a pointer device driver;
creating a unified pointer message at an application programming interface layer representing the coordinate input from a touch input hardware and a mouse hardware as a single event type using a superset of data that is common to a plurality of pointer devices and a subset of data including a device specific data set that is specific to a pointer device among the plurality of pointer devices;
sending the unified pointer message to an application; and
processing the device specific data set unhandled by the application.

9. The tangible machine-readable medium of claim 8, wherein the method further comprises:
identifying in the unified pointer message a pointer device providing the coordinate input.

10. The tangible machine-readable medium of claim 8, wherein the method further comprises:
receiving a promotion directive from the application.

11. The tangible machine-readable medium of claim 8, wherein the method further comprises:
promoting a legacy device message based on the unified pointer message.

12. The tangible machine-readable medium of claim 8, wherein the method further comprises:
identifying a current device specific state in the unified pointer message.

13. The tangible machine-readable medium of claim 8, wherein the method further comprises:
identifying a previous device specific state in the unified pointer message.

14. The tangible machine-readable medium of claim 8, wherein the method further comprises:
calculating a device specific state delta for the unified pointer message.

15. A pointer device interface, comprising:
an input device interface configured to receive a coordinate input from a pointer device driver;
a processor configured to execute an application programming interface layer that creates a unified pointer message representing the coordinate input from a touch input hardware and a mouse hardware as a single event type using a superset of data that is common to a plurality of pointer devices and a subset of data including a device specific data set that is specific to a pointer device among the plurality of pointer devices, send the unified pointer message to an application, and process the device specific data set unhandled by the application.

16. The pointer device interface of claim 15, wherein the unified pointer message represents the coordinate input from at least one of a computer pen and a gesture capture device.

17. The pointer device interface of claim 15, wherein the processor is configured to identify in the unified pointer message the pointer device driver providing the coordinate input.

18. The pointer device interface of claim 15, wherein the processor is configured to translate the unhandled device specific data set to at least one of a mouse event and a gesture event for the application.

19. The pointer device interface of claim 15, wherein the processor is configured to promote a legacy device message based on the unified pointer message.

20. The pointer device interface of claim 15, wherein the processor is configured to calculate a device specific state delta for the unified pointer message.

* * * * *